Sept. 3, 1935.  V. K. ZWORYKIN  2,013,594
INDICATING DEVICE
Filed July 16, 1930
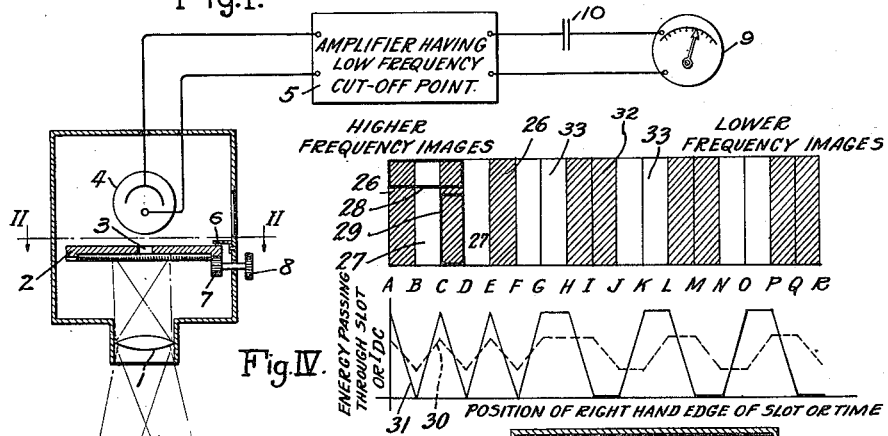
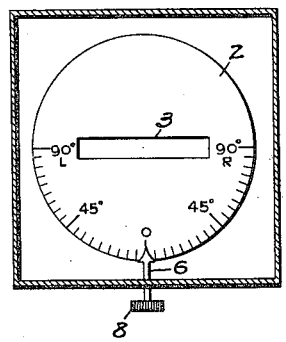
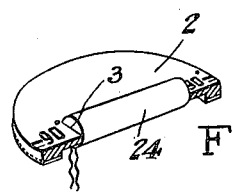
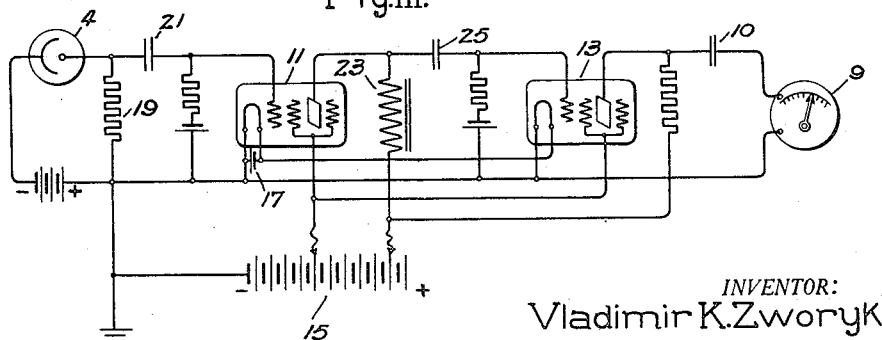
INVENTOR:
Vladimir K. Zworykin,
BY J. R. Goldsborough
HIS ATTORNEY Patented Sept. 3, 1935

2,013,594

UNITED STATES PATENT OFFICE 2,013,594

INDICATING DEVICE

Vladimir K. Zworykin, Collingswood, N. J., assignor, by mesne assignments, to Radio Corporation of America, New York, N. Y., a corporation of Delaware Application July 16, 1930, Serial No. 468,277

18 Claims. (Cl. 177—352)

My invention relates to indicating devices, and it has particular relation to drift-indicators for use on aerial vehicles.

One of the most troublesome problems with which aviators have to contend in aerial navigation, is that of accurately following a predetermined route when the aeroplane encounters cross winds which cause it to drift to one side or the other of the designated course.

It is, of course, possible to obtain a rough measure of the drift by direct observation of the terrain over which the plane is flying, but such direct observation cannot be had during fog or other adverse weather conditions.

It is, accordingly, an object of my invention to provide a drift-indicator that shall function satisfactorily, to give an indication of the drifting of an aeroplane from its true course, irrespective of weather conditions.

Another object of my invention is to provide a drift-indicator that shall be substantially automatic in operation.

Another object of my invention is to provide a device that shall give an indication of drift which is substantially independent of the topography of the ground over which the aeroplane is passing.

A preferred embodiment of my invention comprises an optical system so mounted and disposed with respect to a mask having a narrow slot extending therethrough, that an image of the terrain, over which the aeroplane is passing, may be thrown upon the said screen. A photo-cell is disposed rearwardly of the slot in the mask and the terminals thereof are connected to an alternating current amplifier preferably having a low frequency cutoff point in the neighborhood of 1,000 cycles.

The output terminals of the amplifier are connected to an indicating device such as an A. C. meter or other appropriate indicating device.

The mask is mounted horizontally and it is provided with means whereby it may be rotated around a vertical axis with respect to a stationary fiduciary mark or pointer means that indicates the axis of the aeroplane or the normal direction of flight thereof in the absence of cross winds. The periphery of the mask is, preferably, graduated in degrees in order that the exact deviation of the aeroplane from its true course may be observed.

In order that the system shall be sensitive to infra-red rays, I prefer to construct the lenses in the optical system either of a phenol condensation product or of rock salt. Such lenses, as is well known to those skilled in the optical art, permit the passage of infra-red rays and enable my improved drift indicator to function properly in spite of fog.

The novel features that I consider characteristic of my invention, are set forth with particularity in the appended claims. The invention itself, however, both as to its organization and its method of operation, together with additional objects and advantages thereof, will best be understood from the following description of a specific embodiment when read in connection with the accompanying drawing, in which:—

Fig. I is a diagrammatic view, partly in section, of a complete aeroplane drift-indicator constructed and arranged according to my invention.

Fig. II is a view taken along a line corresponding to the line II—II in Fig. I.

Fig. III is a diagrammatic view of an amplifier designed to have a low frequency cut-off.

Fig. IV is a curve diagram illustrating certain operating characteristics of the apparatus shown in the preceding figures, and Fig. V is a view in perspective and partly in section of a portion of Fig. II showing a modification thereof.

The apparatus illustrated in the drawing comprises an optical system exemplified by a lens 1, a rotatable mask 2 provided with a narrow slot 3 extending therethrough as shown in Fig. II, and a photoelectric cell 4, the output terminals of which are connected to an A. C. amplifier 5, having a low frequency cutoff-point.

The mask is preferably mounted in bearings (not shown) for rotation adjacent to an indicating pointer means 6, and is provided with peripheral teeth which engage with a small pinion 7 that may be turned manually by a knob 8. The mask is preferably provided with a series of peripheral graduations reading from zero to "90°-Left" in one quadrant, and from zero to "90°-Right" in the adjacent quadrant. These graduations are for a purpose that will, hereinafter, be described in detail. If desired, the position of the graduations may be shifted 90° with respect to slot 3.

The output from the amplifier is impressed upon an alternating current meter 9 through a small coupling condenser 10.

An amplifier of a preferred type is illustrated diagrammatically in Fig. III of the drawing and includes a plurality of thermionic devices 11 and 13 of the screen-grid type. A common source 15 of plate potential and screen grid biasing potential is provided, as well as a common source 17 of filament potential.

The photo-electric cell 4 is coupled to the first thermionic device 11 by means of a resistor 19 and a coupling condenser 21 and the first thermionic device is, in turn, coupled to the second thermionic device 13 through a choke coil 23 and a small coupling condenser 25.

By proper choice of the coupling resistor 19, the coupling choke coil 23, and the several coupling condensers 21, 25, and 10, the amplifier may be given a low frequency cut-off at any desired point in the audiofrequency spectrum, as is well known to those skilled in the art.

Although the photo-cell is illustrated as being physically disconnected from the slotted mask, it lies within the scope of my invention to mount it directly upon the mask, in order that it shall be rotated therewith, or to substitute an elongated photo-cell for the slot.

For example, referring to Fig. V, a photo-cell 24 may be located in the slot 3 in the rotatable mask 2 whereby the same effect may be obtained as in the construction shown in Fig. I wherein the images are caused to traverse the photo-cell in accordance with the position of the slot. Substantially all white light reflected from the ground contains color frequencies from that of infra-red to ultra-violet. This fact is quite well known and it has been made use of in the past for photography of distant objects through telephoto cameras equipped with ray filters, whereby only the infra-red radiation was utilized. This fact can very easily be substantiated by referring to almost any standard publication dealing with photography, for example page 625 of the 1928 edition of "Physical Optics" by R. W. Wood.

In order that the indicating device shall give an indication of the aeroplane drift, it is necessary that the difference in response of the photocell to ground image signals when the ground image moves parallel to the slot and when it moves transversely thereof shall be accentuated.

It is obvious that the details of any ground image moving along the slot will remain on the photocell longer than when the said ground image is moving transversely of the slot. Such being the case, the output of the photocell in response to the ground image is higher when it moves transversely of the slot than when the image moves along the slot.

Therefore, irrespective of the character of the terrain over which the aeroplane is flying, the ground image passing over the slot and falling upon the photo-cell, will cause maximum deflection of the indicating device when the said image moves transversely of the said slot.

However, it will be seen that at extremely low frequencies the rotation of the slot from a position wherein the details of the ground image move along the slot to a position wherein the ground image moves transversely of the slot would have no appreciable effect upon the amplitude of the indications and, accordingly, it is desirable to provide means for attenuating or removing indications in the lower frequency range.

As pointed out hereinbefore, the amplifier may be given a low frequency cut-off at any desired point.

The low frequency response usually gives poor definition, while with the higher frequency images the indications are much more reliable since it is easy to differentiate between the response received with the slot in one position and in another position over a given terrain.

In the system disclosed it has been found that the accuracy of the readings is improved by attenuating the output from the photocell in the lower end of the audio-frequency range. In the present example, the amplifier may be so designed that signals at the frequency below 100 cycles per second are not appreciably amplified thereby.

In the operation of my improved drift indicator, the image of the terrain over which the aerial vehicle is passing, if focused upon the under side of the masking device and part of the image passes through the slot to fall upon the light-sensitive cathode of the photo-cell. When the image of the ground is in motion with respect to the slot, the photo-electric current produced by the photocell will be different for different positions of the slot with respect to the direction of motion. When the slot is disposed at an angle 90° with respect to the direction of movement of the plane with respect to the ground, the ground-image will create a random frequency-spectrum with a well-pronounced peak in the audio frequency range, the position of the peak depending upon the elevation of the plane, its speed and the electrical constants of the apparatus.

If the mask is then so rotated that the slot is parallel to the motion of the plane, the peak will be shifted, for this second position of the slot, to a point in the frequency-spectrum below the cut off point of the amplifier. A maximum deflection of the meter, therefore, indicates that the slot is transverse to the actual movement of the aeroplane, and the position of the peripheral scale, with respect to the fiduciary mark, shows the angularity between the aeroplane's apparent course and its motion with respect to ground.

Referring to Fig. IV, if the energy through the slots is plotted as normal direct current $I_{DC}$, and the operating current output as $I_A$ and $I_B$, respectively, along a time axis, substantially in the form shown, then curve 30 may be represented by—

$$I_A = I_{DC} + k_A \left\{ \frac{\pi}{2} - \frac{4}{\pi} \sum_1^\infty \frac{\cos(2\pi-1)\frac{2\pi}{T}t}{(2\pi-1)^2} \right\} \quad k_A = \frac{I_A}{\pi}$$

and curve 31 by $$I_B = k_B \left\{ \frac{\pi}{2} - \frac{4}{\pi} \sum_1^\infty \frac{\cos(2\pi-1)\frac{2\pi}{T}t}{(2\pi-1)^2} \right\} \quad k_B = \frac{I_B}{\pi}$$

Now, $k_A$ and $k_B$ are different in values and $k_B$ is greater than $k_A$. In the present system, a low frequency band is removed, hence the energy which the system absorbs from the signal will be proportional to $$E_a \sim k_B^2 \sum_{w_0}^{w_1} \left\{ \frac{4}{\pi} \frac{\cos(2\pi-1)\frac{2\pi}{T}t}{(2\pi-1)^2} \right\}^2$$

$$E_D \sim k_A^2 \sum_{w_0}^{w_1} \left\{ \frac{4}{\pi} \frac{\cos(2\pi-1)\frac{2\pi}{T}t}{(2\pi-1)^2} \right\}^2$$

It is obvious then that the system adjusted according to the curve 31 will absorb more energy from the signal than the system adjusted according to the curve 30 in the ratio $$\left\{ \frac{k_B}{k_A} \right\}^2.$$

There is, therefore, an amplitude separation, and it is possible therefore to know the orientation of the pattern with respect to the slots, the signal of maximum intensity being obtained when scanning with the narrow slots.

When the drift indicator is passing over a terrain which causes a random image to pass over the slot, some of the objects passed over will produce lower frequency signals while others will produce higher frequency signals. Rotating the slot will not have an appreciable effect upon the amplitude of the lowest frequency response, but it will materially change the amplitude of the higher frequency response. In this sense, the rotation of the slot can be said to change the predominating signal frequency.

Referring again to Fig. IV, assume that a portion of the surface of the earth may be divided into strips of equal width, represented between the lines A to F for higher frequency images and from H to R for lower frequency images. Assume that the cross-hatched strips 26 emit no infra-red rays, while the other strips 27 emit infra-red rays of uniform distribution, and that an aeroplane is flying over this surface in a direction across the strips and from left to right. Assume further that the aeroplane carries an indicating device as illustrated, including a photocell mask having an elongated slot which may be turned between two different positions indicated in the drawing by the rectangles 28 and 29, the rectangle 28 extending parallel to the direction of flight and the rectangle 29 extending at a right angle to the direction of flight. Assume further that the elevation and dimensions of the slot are such that it can pass infra-red rays from the high frequency portion of the field which is as wide as a strip and as long as the width of three strips.

Plotting the curves for the energy passing through the slot as it is carried across the surface in each of the positions 28 and 29, the curves 30 and 31, respectively, will result, the ordinates of the curves representing the energy passing through the slot, and the abscissa representing positions of the right hand edge of the slot as viewed in the drawing.

Referring to the curve 30 for the slot 28, in the position shown, the slot 28 will receive rays through one-third of its area. Taking this as unit energy, as the slot moves across the field, the energy through it gradually increases until the right hand end of the slot is along the line E. As the slot 28 moves further, the energy through it begins to decrease until it again reaches a minimum when the right hand end of the slot is along the line F.

The curve 31, representing the energy received through the slot 29, is plotted in a similar manner. An inspection of these two curves indicates that while the frequency is the same in both cases, the energy received through the slot 29 is much greater, and for a high frequency image, rotation of the slot may, therefore, be utilized to provide a response in the indicating apparatus of an appreciable magnitude.

In the case that lower frequency images are received, if the same fall below a predetermined frequency level whereat indications may be obscured, the cut-off characteristic of the amplifier is such that the remaining high frequency images may provide a sufficient indication of change of direction or drift.

For the reason that rotation of the slot will change materially the magnitude of the high frequency response as compared with the low frequency response, in this sense rotation of the slot may be said to change the predominating frequency.

The low frequency cut-off is not essential to the operation of the drift indicator, but it materially aids the sharpness and obtainable accuracy of the readings. This will be seen by choosing a frequency response which may be represented by bars which are twice as wide as the bars above described, such bars being shown in Fig. IV at 32 and 33 corresponding to the bars 26 and 27. While maintaining the slot area and dimensions the same, the energy received through the slot 29 will not differ materially, except in wave shape, from that received through the slot 28, and therefore rotation of the slot will not show as great a difference or show the drift indication as clearly and as certainly as in response to higher frequency images. The amplifier is therefore designed to remove the low frequency response so that the resulting poor definition will not obscure the indications received from the higher frequency energy.

From an inspection of Fig. IV, it will therefore be seen that the difference in the energy passing through the slot between the positions 28 and 29 corresponding to the curves 30 and 31 respectively will not be as great for the low frequency images as it is for the high frequency images, and having a tendency for the curve 30 to increase in area with respect to the curve 31 as the frequency is decreased. As has hereinbefore been stated, the low frequency cut-off may be adjusted by means of the amplifier to a frequency of 1,000 cycles, for example, to remove the low frequency response below a point whereat differentiation between the two positions of the slot is not provided by the adjustment of the slot thereby permitting whatever high frequency response is present to be effective in giving an indication.

Although I have illustrated and described only certain specific forms of my invention, many modifications thereof will be apparent to those skilled in the art to which it pertains. My invention, therefore, is not to be limited except insofar as is necessitated by the prior art, or by the spirit of the appended claims.

I claim as my invention—

1. In an aeroplane drift indicator, the combination of a light sensitive electrical device, an optical system for impressing upon said device a view of the terrain over which an aeroplane is flying, a mask interposed between said device and said view, the mask being provided with an elongated opening, and means for causing said mask to rotate about the axis of said optical system in a plane substantially parallel with the terrain to be viewed.

2. In an aeroplane drift indicator, the combination of a photo-electric device, an optical system, slotted masking means interposed between said device and said system, said masking means being rotatable in a horizontal plane on a vertical axis and being provided with peripheral indicia and a fixed fiduciary mark corresponding to the normal direction of flight with respect to which said masking means may be rotated.

3. The invention according to claim 18 characterized in that the amplifying means has a low frequency cut-off point in the neighborhood of one thousand cycles.

4. An aeroplane drift-indicator including in combination, a rotatable mask having therein an elongated light transmitting aperture, means for rotating said mask in a plane substantially parallel to a terrain feature, means for indicating the angular relation of the mask to a direction of flight, means located on one side of said mask providing an optical axis through said aperture, a light sensitive electric cell located in the line of said optical axis on the opposite side of said mask, a current responsive indicating device connected with said light sensitive cell, and an electric amplifier and means providing a low frequency cut off point in the frequency response range thereof in the connection between said cell and said device.

5. An aeroplane drift-indicator including in combination, a light sensitive electric cell, a current responsive device connected with said cell whereby it is responsive to current indications therefrom, means interposed in circuit between said cell and said device for preventing the transmission of current indications from the cell to said device at frequencies within a certain predetermined low range, means for impressing upon said cell a view of a portion of the terrain from an aeroplane in flight, and means for controlling the application of said view to said cell, said last named means including an optical mask interposed between the cell and the view impressing means, said mask having an elongated light transmitting aperture and being movable in a plane substantially parallel with the terrain to be viewed between limits wherein the longitudinal axis of the aperture extends in the direction of flight or at substantially a right angle to the direction of flight, and means for indicating the angular position of said aperture with respect to the direction of flight.

6. The method of measuring the drift of an aerial body in flight, which includes generating photo-electric currents by photo-electrically scanning the terrain below a higher frequency range of light vibrations and adjusting the direction of scanning with respect to the longitudinal axis of said body or the normal direction of flight until a maximum indication of the current generated is obtained in such higher frequency range and then providing an indication of the angular relation between said axis or direction of flight and the adjusted direction of scanning corresponding to said maximum generated current indication.

7. In an aeroplane drift indicator, an electrical light-sensitive device, light masking means therefor having an elongated aperture for admitting thereto a limited view of a terrain over which an aeroplane is flying, means for shifting about an axis of rotation, the position of said aperture in a plane in parallel relation to the terrain to be viewed, and means for attenuating the signal output from the light sensitive device in a predetermined low frequency range.

8. In an aeroplane drift indicator, an electrical light-sensitive device, light masking means therefor having an elongated aperture for admitting thereto a limited view of a terrain over which an aeroplane is flying, means for shifting about an axis of rotation, the position of said aperture in a plane in parallel relation to the terrain to be viewed, means for indicating the degree of shift of the aperture from a predetermined initial position, and electrical means connected with said light-sensitive device for attenuating the signal output therefrom over a predetermined low frequency range.

9. In an aeroplane drift indicator, an electrical light-sensitive device, light masking means therefor having an elongated aperture for admitting thereto a limited view of a terrain over which an aeroplane is flying, means for shifting about an axis of rotation, the position of said aperture in a plane in parallel relation to the terrain to be viewed, and means for electrically amplifying the higher frequency signal output of said device to a higher degree than the lower frequency signal output therefrom below a predetermined lower frequency.

10. In an aeroplane drift indicator, an electrical light-sensitive device, light masking means therefor having an elongated aperture for admitting thereto a limited view of a terrain over which an aeroplane is flying, means for shifting about an axis of rotation, the position of said aperture in a plane in parallel relation to the terrain to be viewed, and means connected with the masking means and aperture for indicating the degree of shift of the aperture from a predetermined initial position, said last named means including a scale having indicia and an indicator associated with and relatively movable with respect to the scale indicia.

11. In an aeroplane drift indicator, an electrical light-sensitive device, a rotary light mask therefor having an elongated aperture for admitting thereto a limited view of a terrain over which an aeroplane is flying, means for shifting about an axis of rotation, the position of said aperture in a plane in parallel relation to the terrain to be viewed, and means for indicating the degree of shift of the aperture from a predetermined initial position, and said last named means including peripheral indicia carried by the mask and fixed pointer means associated therewith and adapted to be connected to the aeroplane.

12. In an aeroplane drift indicator, an electrical light-sensitive device, light masking means therefor having an elongated aperture for admitting thereto a limited view of the terrain below, means for shifting about an axis of rotation the position of said aperture in a plane in parallel relation to the terrain, and means for attenuating the signal output from the light sensitive device in the low frequency end of the audio frequency range.

13. In an aeroplane drift indicator, an electrical light-sensitive device, light masking means therefor having an elongated aperture for admitting thereto a limited view of the terrain below, means for shifting about an axis of rotation, the position of said aperture in a plane in parallel relation to the terrain, and means for electrically amplifying the signal output of said device to a greater degree when subjected to higher frequency images passing thereover.

14. In an aeroplane drift indicator, a light sensitive electrical device, optical means pervious to infra-red rays for impressing upon said device a view of the terrain over which an aeroplane is flying, and light masking means interposed between said optical system and said device arranged to lie in a plane substantially parallel with the terrain for restricting the dimensions of said view, said means having an elongated aperture adjustable in that plane about an axis of rotation with respect to the direction of flight.

15. The combination defined in claim 1, further characterized in that the opening in said masking means has a length large in comparison with its width.

16. The combination defined in claim 1, further characterized in that the opening in said masking means has a ratio of length to width of the order of 1000.

17. The combination defined in claim 1, further characterized in that the light sensitive device is elongated and lies in said opening.

18. In an aeroplane drift indicator, photo-sensitive electrical means, masking means therefor having an elongated aperture adjustable about an axis of rotation with respect to the direction of flight in a plane substantially parallel with the terrian over which an aeroplane is flying, for impressing a minor longitudinal view of said terrain upon said photo-sensitive means, amplifying means responsive to the output current from said photo-sensitive means, said amplifying means having a low frequency cut-off characteristic, and indicating means connected with and controlled by said amplifying means.

VLADIMIR K. ZWORYKIN.